UNITED STATES PATENT OFFICE.

JAMES B. HARRIS, JR., OF GENESEO, NEW YORK.

ROLLER-SKATE.

SPECIFICATION forming part of Letters Patent No. 337,151, dated March 2, 1886.

Application filed September 20, 1884. Serial No. 143,566. (Model.)

*To all whom it may concern:*

Be it known that I, JAMES B. HARRIS, Jr., of Geneseo, in the county of Livingston and State of New York, have invented certain new and useful Improvements in Roller-Skates, of which the following is a full, clear, and exact description.

The object of my invention is to allow persons using roller-skates to stop instantly or slacken speed at will; and it consists in the combinations of parts. including their construction, substantially as hereinafter described and claimed.

Reference is to be had to the accompanying drawings, forming part of this specification, in which similar letters of reference indicate corresponding parts in both the figures.

Figure 1 is a side view, and Fig. 2 an inverted plan view, of a skate with the improvement.

The brackets $c$, attached to foot piece $a$, may be of any usual construction. As shown, the portion $g$ of each bracket, formed with axle-box $b$, is pivoted for lateral movement, and fitted with a rubber buffer, $i$. On the rear axle-box, $b$, is a rigid arm, $d$, formed to extend to the rear, and made in its outer end with a socket, $e$, that is fitted with a rubber block, $f$. This rubber $f$ is held projected more or less by the adjusting-screw $k$, that passes through the base of socket $e$. The arm $d$ in its normal position, with both forward and rear rollers on the floor, holds the rubber up out of contact with the floor or surface. By raising the toe of the skate slightly the rubber block is brought down into contact with the floor with more or less pressure, as desired, and in that manner the skater's speed is checked or a stop quickly made.

This brake device is convenient, besides providing means for avoiding collisions, and it also serves to prevent persons falling backward, as frequently occurs.

For new beginners the rubber block may be adjusted to touch the floor, or nearly so.

Any material suitable may be used in place of the rubber block.

Having thus described my invention, what I claim as new, and desire to secure by Letters Patent, is—

1. In a roller-skate, the combination, with an arm fixed to and extending from a roller-carrier, and provided with a socket at its end, and with a rubber block held in said socket, of a set-screw at the base of the socket, substantially as shown and described.

2. The combination, with a roller-skate, of a socketed arm containing an adjustable stop, said arm being fixed to and extending from one of the roller-carriers, substantially as shown and described.

3. In a roller-skate, the combination, with the roller-carrier $gb$, of the arm $d$, provided at its outer end with the socket $e$, the buffer-block $f$, held in said socket, and the set-screw $k$, substantially as shown and described.

JAMES B. HARRIS, JR.

Witnesses:
 JNO. M. MILNE,
 MYRON N. FOSTER.

(No Model.)
H. HAWLEY,
WINDOW BLIND.
No. 337,152. Patented Mar. 2, 1886.
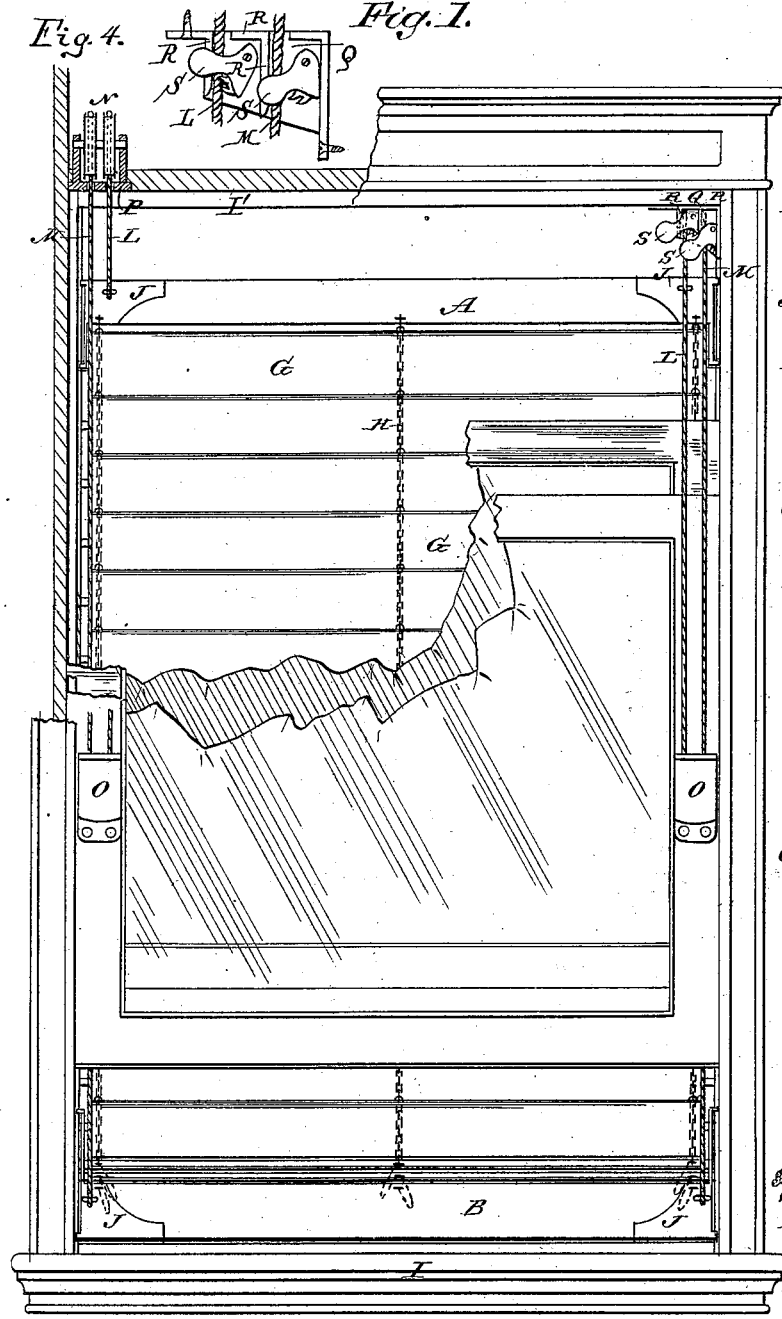
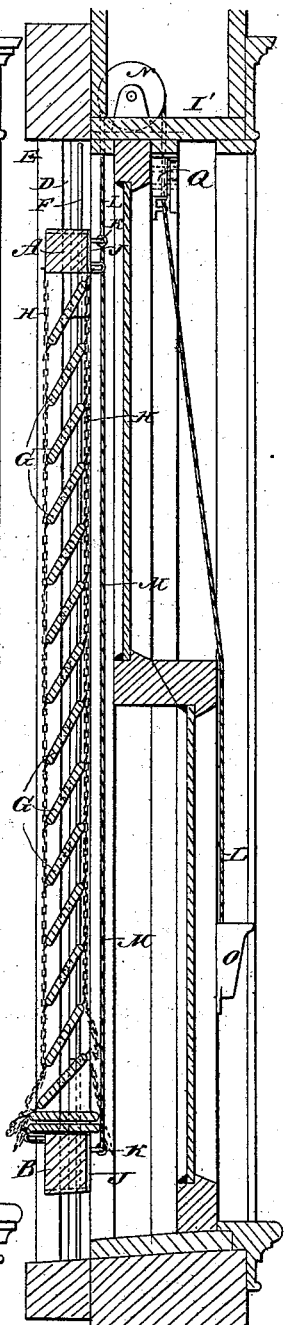
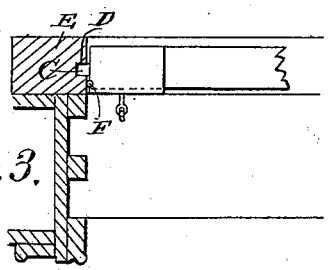
WITNESSES:
INVENTOR:
Henry Hawley
BY Munn & Co
ATTORNEYS.